Patented Sept. 7, 1943

2,329,149

UNITED STATES PATENT OFFICE 2,329,149

FLOTATION PROCESS

Nathan Weiner, West Forest Hills, N. Y., assignor to Bonneville, Limited, New York, N. Y., a corporation of Delaware No Drawing. Application November 4, 1940, Serial No. 364,253

5 Claims. (Cl. 209—166)

This invention relates to the froth flotation of ores and salt mixtures containing potassium and sodium chlorides. The invention provides a new flotation process by which potassium chloride may be advantageously separated from such ores or salt mixtures by the use of new flotation agents.

The new flotation agents used in the process of this invention are water soluble salts of straight chain mono-acyl derivatives of ethylene diamine, in which the acyl group contains 10 or more carbon atoms. The new flotation agents may be represented by the formula:

R.NH—C2H4NH2.HX in which X is an anion and R is a straight chain acyl group advantageously containing from 10 to 18 carbon atoms, compounds in which R contains from 12 to 14 carbon atoms being used with particular advantage. The new flotation agents are advantageously used in the form of their hydrochloride salts, although any other suitable water soluble salts may, of course, be used.

The new flotation agents may be used either alone or in admixture with other agents. Mixed acyl derivatives advantageously used may be derived from the fatty acids contained in natural oils and waxes which contain a major proportion of fatty acids having from 10 to 18 carbon atoms such as, for example, corn oil, palm oil, cottonseed oil, etc. Oils and waxes containing a major proportion of fatty acids having from 12 to 14 carbon atoms such as, for example, palm kernel oil, cocoanut oil, bayberry wax, etc., yield mixed acyl derivatives which are particularly advantageous in the practice of the invention.

The new flotation agents are advantageously prepared in general by reacting an ester of the fatty acid whose acyl derivative is desired with a large excess of ethylene diamine. Such preparation is illustrated by the preparation of mono-capryl ethylene diamine hydrochloride, which is readily prepared in the following manner:

One mol of methyl caprate is mixed with 5.4 mols of 70% ethylene diamine and stirred at 100° centigrade for 4 hours. The resulting suspension of solid and viscous liquid is cooled, with stirring to keep the solid finely divided. Ether is then added and the mixture thoroughly stirred. At this stage the mixture consists of a solid phase and two layers of liquid, one being an aqueous solution of ethylene diamine and alcohol and the other being an ether solution of mono-capryl ethylene diamine. The solid is filtered from the mixture and washed with ether. It is dicapryl ethylene diamine having a melting point of 162–164° C. The filtrate is separated into the lighter ether layer and the heavier ethylene diamine layer, from which the excess of ethylene diamine may be recovered by distillation. The ether layer on evaporation leaves mono-capryl ethylene diamine having a melting point of 51–51.5° centigrade.

The mono-capryl ethylene diamine is readily converted into the water-soluble hydrochloride by dissolving it in ether and then treating it with gaseous hydrogen chloride until no further separation of mono-capryl ethylene diamine hydrochloride takes place. The salt is separated by centrifuging at low temperature and is then dried in vacuo.

The hydrochlorides of mono-lauroyl, mono-myristoyl, mono-palmitoyl, mono-stearoyl, etc., ethyene diamine may be prepared by the method described above for the preparation of mono-capryl ethylene diamine hydrochloride. To prepare salts other than the hydrochloride, other suitable acids may be reacted with the base.

The mixed acyl derivatives containing a major proportion of acyl groups having from 10 to 18 carbon atoms may be prepared in similar fashion by condensing fatty acid triglycerides with ethylene diamine. There will be formed mixtures of diacyl ethylene diamines, which are insoluble in the common water-immiscible solvents, and mixtures of mono-acyl ethylene diamines which are soluble in such solvents. Such triglycerides may be natural oils or fats such as cocoanut oil, palm oil, palm kernel oil, cottonseed oil, bayberry wax, corn oil, castor oil, etc., or mixtures thereof. In the use of these oils, glycerol is produced as the alcohol and may be separated by distillation from the recovered ethylene diamine.

The mixed acyl derivatives may be converted into hydrochlorides or other salts, in the manner indicated in connection with the preparation of mono-capryl ethylene diamine hydrochloride.

The mixed acyl derivatives prepared from natural oils or fats will be named hereafter by reference to the fat or oil from which the acyl derivative has been derived; thus, the acyl derivative produced by condensing palm kernel oil with ethylene diamine will be called palm kernel oil-ethylene diamine, etc.

The use of the new flotation agents in accordance with the process of the invention will be illustrated by reference to the separation of potassium chloride from a crude crystallized mixture of potassium and sodium chlorides from the Bonneville district of Utah. Such crude salt mixtures may be prepared from a brine obtained from a natural salt deposit in the Bonneville district. The potassium chloride content of the deposit is only a few percent., the bulk of the deposit consisting of sodium chloride, together with small amounts of soluble salts, e. g., magnesium chloride. The brine is partially evaporated to allow a large amount of the sodium chloride to crystallize out. The mother liquor is then further evaporated to produce a mixture of salts containing varying amounts of potassium chloride, sometimes as much as 40% or more. This mixture, as a pulp in saturated brine, is subjected to froth flotation in the presence of the reagents. Specific examples are given below:

Example 1

Flotation reagent: Mono-capryl ethylene diamine hydrochloride, 0.24 lb. per ton of crude potassium chloride-sodium chloride mixture.

| Product | Weight | Weight | KCl | Recovery |
|---|---|---|---|---|
| | | Per cent | Per cent | Per cent |
| Tails | 402 | 79.45 | 3.82 | 18.72 |
| Concentrates | 104 | 20.55 | 64.1 | 81.28 |

Example 2

Reagent: Mono-lauroyl ethylene diamine hydrochloride, 0.4 lb. per ton of crude potassium chloride-sodium chloride mixture.

| Product | Weight | Weight | KCl | Recovery |
|---|---|---|---|---|
| | | Per cent | Per cent | Per cent |
| Tails | 442 | 87.7 | 3.76 | 24.8 |
| Concentrates | 62 | 12.3 | 81.4 | 75.2 |

Example 3

Reagent: Mono-myristoyl ethylene diamine hydrochloride, 0.5 lb. per ton of crude potassium chloride-sodium chloride mixture.

| Product | Weight | Weight | KCl | Recovery |
|---|---|---|---|---|
| | | Per cent | Per cent | Per cent |
| Tails | 437 | 89.0 | 3.39 | 24.5 |
| Concentrates | 54 | 11.0 | 84.5 | 75.5 |

Example 4

Reagent: Mono-palmitoyl ethylene diamine hydrochloride, 0.5 lb. per ton of crude potassium chloride-sodium chloride mixture.

| Product | Weight | Weight | KCl | Recovery |
|---|---|---|---|---|
| | | Per cent | Per cent | Per cent |
| Tails | 436 | 90.3 | 3.93 | 30.7 |
| Concentrates | 47 | 9.7 | 82.6 | 69.3 |

Example 5

Cocoanut oil-ethylene diamine hydrochloride, 0.4 lb. per ton of crude potassium chloride-sodium chloride mixture.

| Product | Weight | Weight | KCl | Recovery |
|---|---|---|---|---|
| | | Per cent | Per cent | Per cent |
| Tails | 420 | 85.4 | 5.03 | 27.4 |
| Concentrates | 72 | 14.6 | 78.0 | 72.6 |

Example 6

Bayberry wax-ethylene diamine hydrochloride, 0.6 lb. per ton of crude potassium chloride-sodium chloride mixture.

| Product | Weight | Weight | KCl | Recovery |
|---|---|---|---|---|
| | | Per cent | Per cent | Per cent |
| Tails | 409 | 80.0 | 4.2 | 18.2 |
| Concentrates | 102 | 20.0 | 76.4 | 81.2 |

Example 7

Palm kernel oil-ethylene diamine hydrochloride, 0.6 lb. per ton of crude potassium chloride-sodium chloride mixture.

| Product | Weight | Weight | KCl | Recovery |
|---|---|---|---|---|
| | | Per cent | Per cent | Per cent |
| Tails | 390 | 78.8 | 4.7 | 19.7 |
| Concentrates | 105 | 21.2 | 71.0 | 80.3 |

Although the process of the invention has been illustrated by reference to the separation of potassium chloride from a mixture of sodium and potassium chlorides obtained from the Bonneville district of Utah, it is to be understood that it is also to be used with advantage in separating potassium chloride from other substances containing potassium and sodium chlorides in admixture.

In addition to the acyl derivatives of ethylene diamine specified in the examples, other acyl derivatives may also be used with advantage, e. g., the stearoyl derivative and derivatives produced from the mixed fatty acids obtainable from oils such as corn oil, castor oil, cottonseed oil, palm oil, etc. The various acyl derivatives may be used in admixture in carrying out the process, or they may be used in conjunction with other suitable flotation agents. Suitable frothing agents may also be used in conjunction with the new flotation agents.

The amount of the new flotation agents used in practicing the process of the invention varies, depending among other things upon the amount of potassium chloride in the pulp subjected to flotation. In general the amount of flotation agent is advantageously from about 0.24 to 0.6 pound per ton of salts in the pulp subjected to flotation.

I claim:

1. The process of separating potassium chloride from a pulp containing potassium and sodium chlorides which comprises subjecting said pulp to froth flotation in the presence of a water-soluble salt of a straight chain acyl derivative of ethylene diamine, in which the acyl group contains from 10 to 18 carbon atoms.

2. The process of separating potassium chloride from a pulp containing potassium and sodium chlorides which comprises subjecting said pulp to froth flotation in the presence of a mixture of water-soluble acyl derivatives of ethylene diamine having a major proportion of straight chain acyl derivatives containing from 10 to 18 carbon atoms in the acyl group.

3. The process of separating potassium chloride from a pulp containing potassium and sodium chlorides which comprises subjecting said pulp to froth flotation in the presence of monolauroyl ethylene diamine hydrochloride.

4. The process of separating potassium chloride from a pulp containing potassium and sodium chlorides which comprises subjecting said pulp to froth flotation in the presence of monomyristoyl ethylene diamine hydrochloride.

5. The process of separating potassium chloride from a pulp containing potassium and sodium chlorides which comprises subjecting said pulp to froth flotation in the presence of coconut oil-ethylene diamine hydrochloride.

NATHAN WEINER.